(12) United States Patent
Davis et al.

(10) Patent No.: US 6,309,490 B1
(45) Date of Patent: Oct. 30, 2001

(54) AIR ACTUATED ULTRASONIC TOOL

(75) Inventors: Shawn K. Davis, New Milford; John Ablamsky, Waterbury, both of CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 0 days.

(21) Appl. No.: 09/567,587

(22) Filed: May 10, 2000

(51) Int. Cl.[7] ....................................................... B32B 31/18
(52) U.S. Cl. ..................... 156/73.3; 156/73.1; 156/251; 156/358; 156/515; 156/530; 156/580.2
(58) Field of Search .......................... 156/64, 73.1, 73.3, 156/250, 251, 358, 515, 530, 580.1, 580.2; 264/442, 443, 445

(56) References Cited

U.S. PATENT DOCUMENTS

| | | | |
|---|---|---|---|
| 4,411,720 | 10/1983 | Sager | ....................................... 156/69 |
| 4,701,229 | * 10/1987 | Arakawa et al. | ....................... 156/69 |
| 5,275,767 | * 1/1994 | Micciche | ............................... 264/445 |
| 5,421,923 | * 6/1995 | Clarke et al. | ........................ 156/73.1 |
| 6,063,220 | * 5/2000 | Andersson | ........................... 156/73.1 |

* cited by examiner

Primary Examiner—James Sells
(74) Attorney, Agent, or Firm—Harness, Dickey & Pierce, P.L.C.

(57) ABSTRACT

An ultrasonic tool has an air actuated acoustic horn assembly. An electronic and pneumatic controller generates a predetermined air pressure within the tool. The horn assembly is coupled to the controller for applying a desired actuation force to a part based on the predetermined air pressure. The predetermined air pressure therefore corresponds to the desired actuation force. The horn assembly also transmits mechanical vibrations to the part at a predetermined frequency. The tool further includes an acoustic control system coupled to the horn assembly for transferring a high frequency electrical voltage to the horn assembly. Selectively applying the desired actuation force to the part based on air pressure allows a wider range of forces to be applied, and eliminates problems associated with part damage and marking.

20 Claims, 3 Drawing Sheets

AIR ACTUATED ULTRASONIC TOOL

TECHNICAL FIELD

The present invention relates to ultrasonic acoustic tooling. More particularly, the invention relates to an ultrasonic acoustic tool having an internal air actuated nodal-mounted spring return air cylinder.

BACKGROUND ART

Ultrasonic tools are used in many industries for welding, swaging, and staking, as well as various other activities. In performing these activities it is sometimes necessary to apply a secondary predetermined amount of force to the parts being assembled. Thus, there are occasional non-ultrasonic functions as well as ultrasonic functions to be performed by the same tool. For example, it is often necessary to pre-compress, die cut, perforate, or score a part before, during or after the ultrasonic process.

Conventional nodal mounted ultrasonic welding tools generally utilize a spring-only plunger assembly. The ultrasonic generator sets the horn assembly into resonance along its longitudinal axis, through the introduction of an acoustic converter, in order to transmit mechanical vibrations to the part at a predetermined frequency. The horn assembly typically is a half- or full-wave design for performing ultrasonic operations, and can have a nodal mounted spring actuated plunger mechanism for performing the non-ultrasonic operations. The plunger mechanism is essentially spring biased to stick out of the end of the horn and is typically the first component to contact the part. The horn then continues to move into contact with the part and subsequently welds, stakes, swages (etc.) the part to another part by applying the mechanism vibrations.

There are a number of opportunities for improvement of the above conventional approach. For example, the spring actuated plunger mechanism has a limited range of forces that can be applied to the part. This is a function of the size and tension of the spring. It is therefore desirable to provide an acoustic horn assembly and method that has a wider range of force operation. Another difficulty is associated with the fact that the plunger mechanism is the first component to contact the part and generally cannot be retracted during the welding process. In fact, retraction of the plunger mechanism can only be enabled by retraction of the entire horn assembly. It is commonly known that problems such as part damage and part marking can occur as a result of this phenomenon. It is therefore desirable to provide an acoustic horn assembly having a plunger mechanism that is retractable before, during, or after the ultrasonic welding process.

SUMMARY OF THE INVENTION

The above and other objectives are provided as a method and system for ultrasonically bonding plastic parts. A nodally mounted air cylinder uses an electronic and pneumatic controller, an air pressure regulator and air supply source to operate. The air regulator generates a predetermined air pressure within the tool. The horn assembly is coupled to the air regulator for applying a desired actuation force to a part based on its predetermined air pressure. The predetermined air pressure therefore corresponds to the desired actuation force. The horn assembly transmits mechanical vibrations to the part at a predetermined frequency. The ultrasonic generator transfers high frequency electrical energy at the required frequency to the converter/horn assembly. The converter/horn assembly operates at a predetermined frequency and applies pressure to the part being assembled. By utilizing the electronic and pneumatic controller, along with the air regulator to supply the air pressure to the nodal mounted air cylinder a significantly wider range of forces can be applied. The aforementioned problems with part damage are therefore eliminated.

Further in accordance with the present invention, an air actuated acoustic horn assembly is disclosed. The horn assembly includes an acoustic horn having a longitudinal bore, where the acoustic horn transmits mechanical vibrations to a part at a predetermined frequency. A plunger mechanism is nodally disposed within the longitudinal bore of the acoustic horn, where the plunger mechanism has a stationary portion and a movable portion. The stationary portion is coupled to the horn. The horn assembly further includes an air channel configuration providing an air pathway between the electronic and pneumatic controller and the movable portion of the plunger mechanism, such that air pressure generated by the electronic and pneumatic controller causes the movable portion to extend from the horn and apply a force to the part. In a highly preferred embodiment, the movable portion of the plunger includes a return spring for retracting the movable portion back into the horn when the air pressure is discontinued.

In another aspect of the invention, a method for forming a plastic part is provided. The method includes the step of transmitting mechanical vibrations to the part at a predetermined frequency. The method further provides for generating a predetermined air pressure, and applying a force to the part based on the predetermined air pressure. The force shapes the part into a desired form.

Further objectives, features and advantages of the invention will become apparent from a consideration of the following description and the appended claims when taken in connection with the accompanying drawings.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENT

Figure 1:
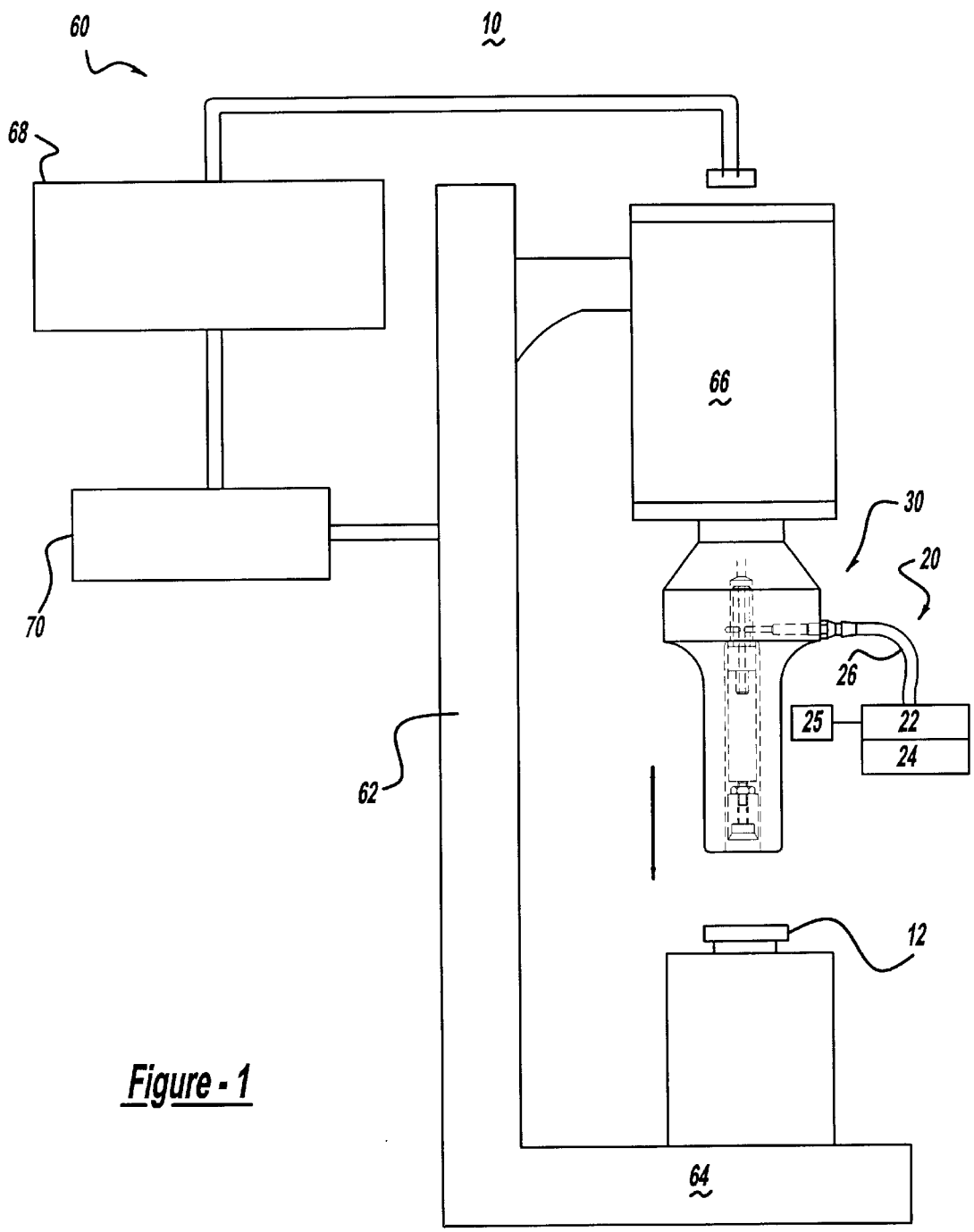
FIG. 1 is a side view of an ultrasonic system in accordance with the present invention.

Turning now to FIG. 1, the preferred ultrasonic tool 10 is shown. It will be appreciated that while the tool 10 is described with respect to a welding process as applied to part 12, the present invention can be readily modified for other welding processes as applied to any component. For example, the tool 10 can be used for staking, swaging, insertion, and spot welding without parting from the spirit and scope of the invention.

It can be seen that the tool 10 has an air regulator 22 for generating a predetermined air pressure within a horn assembly 30. The predetermined air pressure corresponds to a desired actuation force to be applied to the part 12. The horn assembly 30 is coupled to the actuation controller 20

(using electronic and pneumatic components well known in the art) for applying the actuation force to the part 12 based on the predetermined air pressure. The horn assembly 30 also transmits mechanical vibrations to the part 12 at a predetermined frequency when the horn assembly 30 moves from its raised position downward into contact with the part 12. The tool further includes an acoustic control system 60 coupled to the horn assembly 30, where the control system 60 transfers high frequency electrical voltage to the converter 66 and horn assembly 30.

Generally, it can be seen that the control system 60 includes a stand having a vertical column 62 and a base plate 64 for providing structural support to the horn assembly 30. In response to a drive unit (not shown) the converter 66 is able to move reciprocatingly from its raised position toward the base plate 64 and return to the raised position shown. The converter 66 is coupled to the horn assembly 30, and when energized by an electrical generator 68 the converter 66 sets the horn assembly 30 into resonance along its longitudinal axis. It will be appreciated that a high voltage cable extends between the generator 68 and the converter 66 for transferring the high frequency electrical voltage. Furthermore, movement of the converter 66 and the horn assembly 30 is dictated by a control module 70. It will be appreciated that the converter 66 converts the electrical energy from the generator 68 into high frequency vibratory motion, which is coupled to the horn assembly 30. The high frequency energy typically is at a frequency in the range between 1 and 100 kHz, and is preferably 20 kHz, 30 kHz, or 40 kHz.

As already mentioned, the actuation controller 20 generates a redetermined air pressure within the tool 10 corresponding to a desired actuation force with regard to the non-ultrasonic functions of the tool 10. Specifically, it is preferred that the actuation controller 20 include an air supply 24, a regulation system 22 for regulating the air generated by the air supply 22, and an electronic and pneumatic controller 25. Any suitable air pressure system can be used to implement the regulation system 24 and air supply 22. Thus, a conduit 26 such as an air hose can extend between the regulation system 24 and the horn assembly 30 to transfer the air between the two devices.

Figure 2:
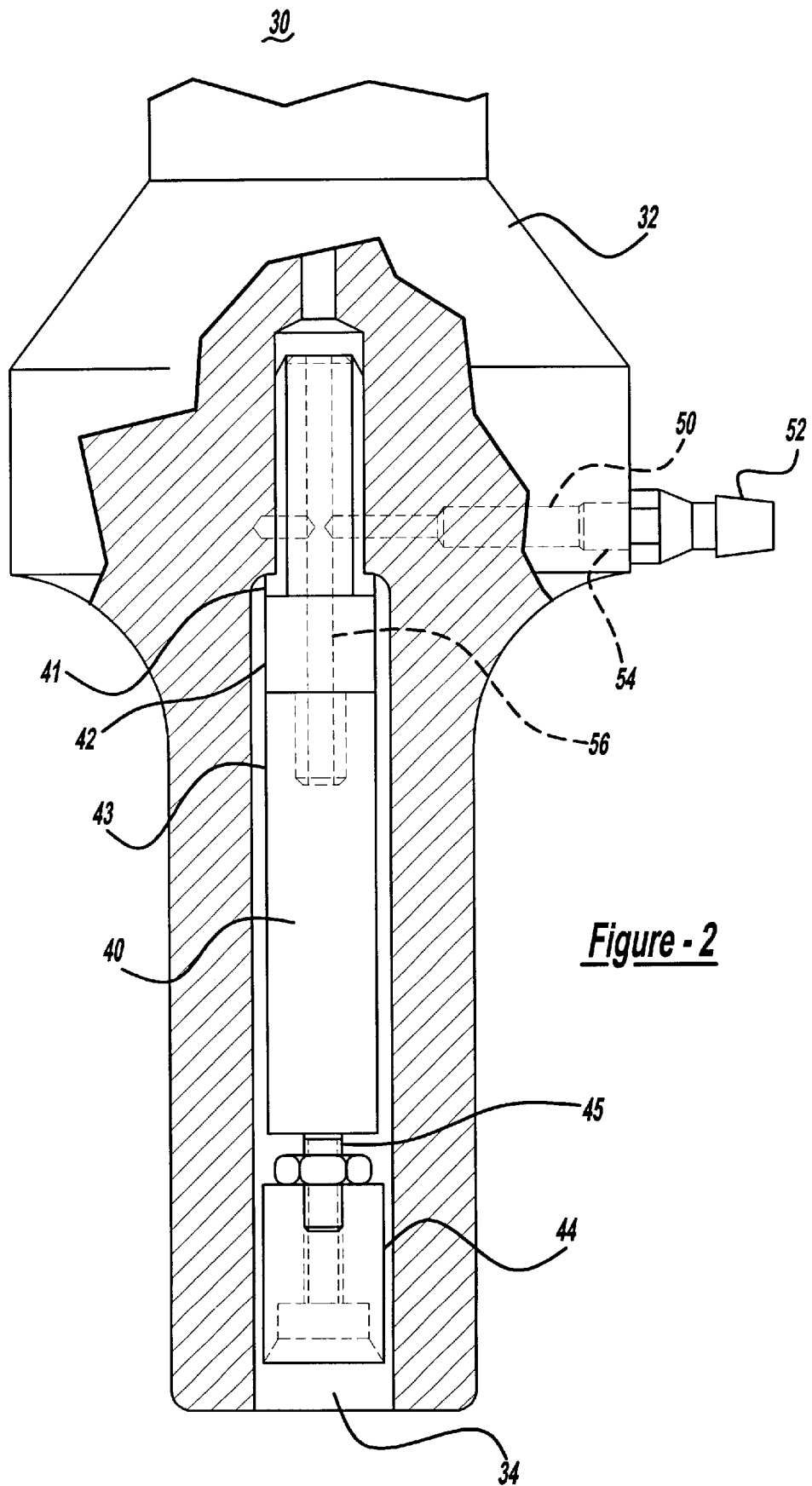
FIG. 2 is a cross-sectional view of an air actuated acoustic horn assembly with the plunger mechanism in the retracted position in accordance with the present invention.
Figure 3:
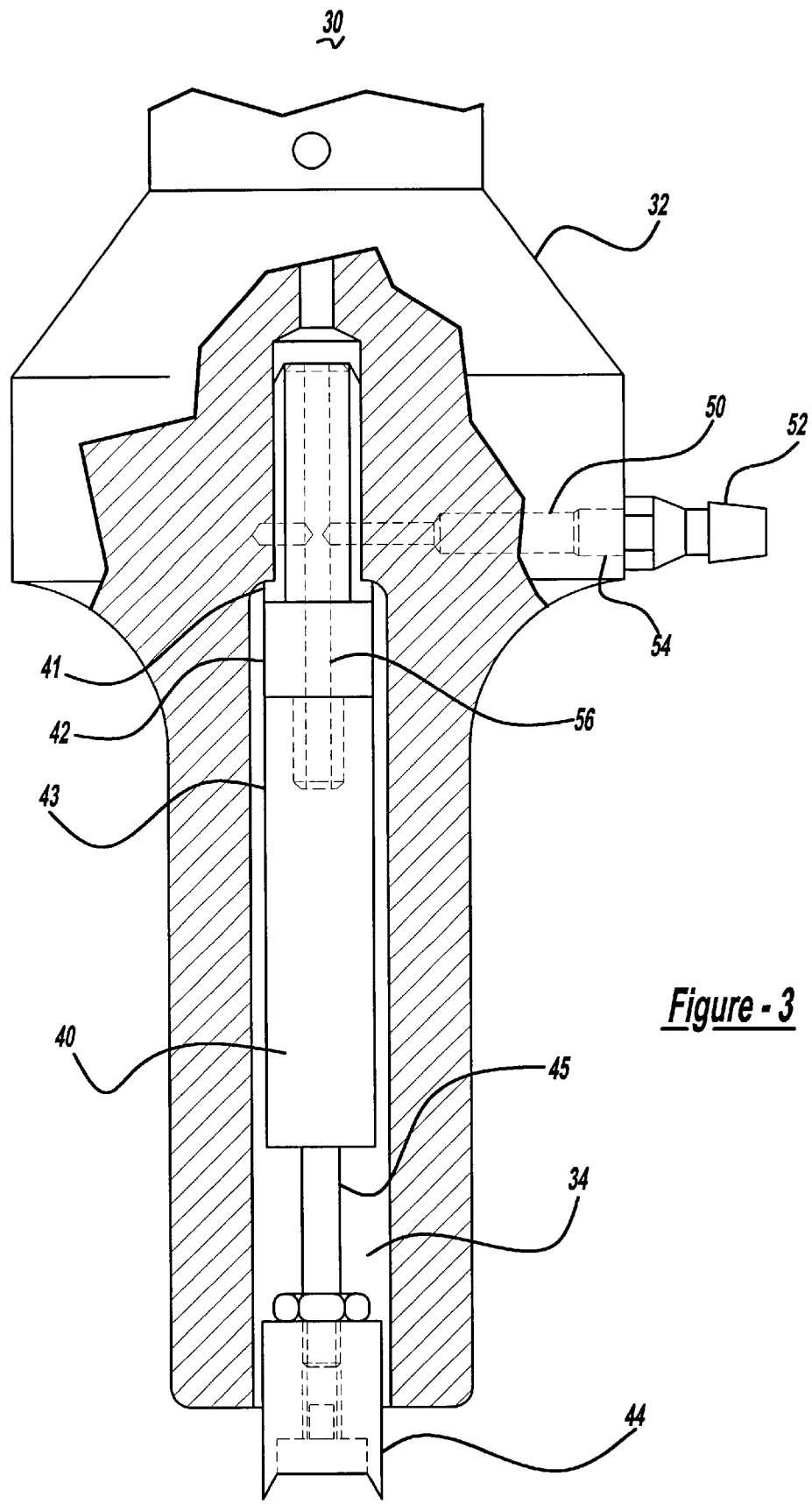
FIG. 3 is a cross-sectional view of an air actuated acoustic horn assembly with the plunger mechanism in the actuated position in accordance with the present invention.

Turning now to FIGS. 2 and 3, the preferred horn assembly 30 will be described in greater detail. Generally, the horn assembly 30 includes an acoustic horn 32, a plunger mechanism 40, and an air channel configuration 50. The horn 32 is either a half-wave or full-wave acoustic horn and has a longitudinal bore 34. The horn 32 transmits the mechanical vibrations to the part 12 (FIG. 1). It is important to note that while the embodiment shown incorporates a cylindrical geometry for the horn 32, the present invention is not limited to such a style. In fact, the horn 32 can be of any shape such as rectangular, rectangular slotted, circular solid, circular hollow, circular slotted, circular high gain, catenoidal or exponential.

The plunger mechanism 40 is nodally disposed within the longitudinal bore 34 of the horn 32. It will be appreciated that the plunger mechanism 40 has a stationary portion coupled to the horn 32 and a movable portion for contacting the part 12 in response to air pressure generated by the actuation controller 20 (FIG. 1).

It is preferred that the stationary portion of the plunger mechanism 40 includes a sleeve 41, a shaft fitting 42, and an air cylinder 43. The sleeve 41 is coupled to an internal diameter of the longitudinal bore 34. The sleeve 41 can be made of Teflon, and is preferably press fitted into the longitudinal bore 34 of the horn 32. The shaft fitting 42 is coupled to the sleeve 41 by a threaded mating configuration and is preferably made of titanium. The air cylinder 43 is coupled to the shaft fitting 42, where the movable portion of the plunger mechanism extends through the air cylinder 43.

It can further be seen that the movable portion of the plunger mechanism 40 includes a contact member 44, a shaft 45, and a return spring (not shown). The contact member 44 applies the actuation force to the part and can have any number of configurations. For example, the contact member 44 can be designed for dye cutting, perforating, scoring, punching, embossing, date coding, batch numbering, precompressing, ejecting, pressure testing, or part locating. The contact member 44 can therefore form or position the part 12 in many different ways. The illustrated embodiment is used for dye cutting.

The shaft 45 is coupled to the contact member 44 by a hex nut and extends between the air channel configuration 50 and the contact member 44. The result is that the air pressure from the air channel configuration 50 causes the contact member 44 to extend from the longitudinal bore 34 as best shown in FIG. 3. The return spring is coupled to the shaft 45 and the stationary portion of the plunger mechanism 40 such that the contact member 44 returns to the longitudinal bore 34 when the air pressure is discontinued.

The air channel configuration 50 will now be described in greater detail. Specifically, it can be seen that the preferred embodiment of the air channel 50 includes an air fitting 52 connected to the horn 32, where the air fitting 52 receives air from the actuation controller (FIG. 1). A horn channel 54 is contained within the horn 32 and provides an air pathway between the air fitting 52 and the stationary portion of the plunger mechanism 40. The air channel configuration 50 further includes a plunger channel 56 contained within the stationary portion of the plunger mechanism 40. The plunger channel 56 provides an air pathway between the horn channel 54 and the movable portion of the plunger mechanism 40. The horn channel 54 and the plunger channel 56 can be drilled using various techniques well known in the art.

In operation, the tool 10 provides a method for forming or locating a plastic part (or assembly) that allows for a much wider range of actuation forces and does not result in part damage. Mechanical vibrations are transmitted to the part at a predetermined frequency, and a predetermined air pressure is generated. The predetermined air pressure corresponds to a desired actuation force. The desired actuation force is applied to the part based on the predetermined air pressure. It will be appreciated that the predetermined air pressure can be selectively generated based on the application and associated operating parameters. In fact, the predetermined air pressure can be discontinued while the mechanical vibrations are being transmitted to the part. This ability makes the tool 10 much more robust and flexible. It will further be appreciated that the plunger mechanism 40 can be removed for servicing and/or design configuration changes. To gain control over internal rotation, the plunger mechanism 40 can have a hexagonal or other non-circular geometry at the perimeter.

The invention has been described with reference to a detailed description of a preferred embodiment for the sake of example only. The scope of the invention is to be determined by proper interpretation of the appended claims.

What is claimed is:

1. A method for forming or bonding a plastic part, the method comprising the steps of:
    transmitting mechanical vibrations to the part at a predetermined frequency;
    generating a predetermined air pressure, the predetermined air pressure corresponding to a desired actuation force; and
    applying the desired actuation force to the assembly based on the predetermined air pressure, the force shaping the part into a desired form.

2. The method of claim 1 further including the step of selectively generating the predetermined air pressure.

3. The method of claim 2 further including the step of discontinuing the predetermined air pressure while the mechanical vibrations are transmitted to the part.

4. The method of claim 1 further including the step of die cutting the part.

5. An ultrasonic tool comprising:
    an actuation controller for generating a predetermined air pressure within the tool, the predetermined air pressure corresponding to a desired actuation force;
    an air actuated acoustic horn assembly coupled to the actuation controller for applying the actuation force to a part based on the predetermined air pressure, the horn assembly transmitting mechanical vibrations to the part at a predetermined frequency; and
    an acoustic control system coupled to the horn assembly, the acoustic control system transferring high frequency electrical voltage to the horn assembly.

6. The ultrasonic tool of claim 5 wherein the horn assembly includes:
    an acoustic horn having a longitudinal bore, the acoustic horn transmitting the mechanical vibrations to the part;
    a plunger mechanism nodally disposed within the longitudinal bore of the acoustic horn, the plunger mechanism having a stationary portion coupled to the horn and a movable portion; and
    an air channel configuration providing an air pathway between the actuation controller and the movable portion of the plunger mechanism such that the air pressure generated by the actuation controller causes the movable portion to extend from the horn and apply the force to the part.

7. The ultrasonic tool of claim 6 wherein the air channel configuration includes:
    an air fitting connected to the horn, the air fitting receiving air from the actuation controller;
    a horn channel contained within the horn, the horn channel providing an air pathway between the air fitting and the stationary portion of the plunger mechanism; and
    a plunger channel contained within the stationary portion of the plunger mechanism, the plunger channel providing an air pathway between the horn channel and the movable portion of the plunger mechanism.

8. The ultrasonic tool of claim 6 wherein the stationary portion of the plunger mechanism includes:
    a sleeve coupled to an internal diameter of the longitudinal bore;
    a shaft fitting coupled to the sleeve; and
    an air cylinder coupled to the shaft fitting, the movable portion of the plunger mechanism extending through the air cylinder.

9. The ultrasonic tool of claim 8 wherein the sleeve includes Teflon, the sleeve being press fitted into the longitudinal bore of the horn.

10. The ultrasonic tool of claim 8 wherein the shaft fitting includes titanium.

11. The ultrasonic tool of claim 6 wherein the movable portion of the plunger mechanism includes:
    a contact member for applying the force to the part;
    a shaft coupled to the contact member, the shaft extending between the air channel configuration and the contact member such that the air pressure from the air channel configuration causes the contact member to extend from the longitudinal bore; and
    a return spring coupled to the shaft and the stationary portion of the plunger mechanism such that the contact member returns to the longitudinal bore when the air pressure is discontinued.

12. The ultrasonic tool of claim 5 wherein the actuation controller includes:
    an air supply;
    a regulation system for regulating the air generated by the air supply; and
    a conduit extending between the air supply and the horn assembly.

13. The ultrasonic tool of claim 5 wherein the actuation controller selectively generates the predetermined air pressure.

14. The ultrasonic tool of claim 13 wherein the actuation controller discontinues the predetermined air pressure while the horn assembly transmits the mechanical vibrations to the part.

15. An air actuated acoustic horn assembly comprising:
    an acoustic horn having a longitudinal bore, the acoustic horn transmitting mechanical vibrations to a part at a predetermined frequency;
    a plunger mechanism nodally disposed within the longitudinal bore of the acoustic horn, the plunger mechanism having a stationary portion coupled to the horn and a movable portion; and
    an air channel configuration providing an air pathway between an actuation controller and the movable portion of the plunger mechanism such that air pressure generated by the actuation controller causes the movable portion to extend from the horn and apply a force to the part.

16. The horn assembly of claim 15 wherein the air channel configuration includes:
    an air fitting connected to the horn, the air fitting receiving air from the actuation controller;
    a horn channel contained within the horn, the horn channel providing an air pathway between the air fitting and the stationary portion of the plunger mechanism; and
    a plunger channel contained within the stationary portion of the plunger mechanism, the plunger channel providing an air pathway between the horn channel and the movable portion of the plunger mechanism.

17. The horn assembly of claim 15 wherein stationary portion of the plunger mechanism includes:
    a sleeve coupled to an internal diameter of the longitudinal bore;
    a shaft fitting coupled to the sleeve; and
    an air cylinder coupled to the shaft fitting, the movable portion of the plunger mechanism extending through the air cylinder.

18. The horn assembly of claim 17 wherein the sleeve is a Teflon sleeve, the Teflon sleeve being press fitted into the longitudinal bore of the horn.

19. The horn assembly of claim 17 wherein the shaft fitting is a titanium shaft fitting.

20. The horn assembly of claim 15 wherein the movable portion of the plunger mechanism includes:
   a contact member for applying the force to the part;
   a shaft coupled to the contact member, the shaft extending between the air channel configuration and the contact member such that the air pressure from the air channel configuration causes the contact member to extend from the longitudinal bore; and
   a return spring coupled to the shaft and the stationary portion of the plunger mechanism such that the contact member returns to the longitudinal bore when the air pressure is discontinued.

* * * * *